July 14, 1953

W. VAN B. ROBERTS 2,645,769

CONTINUOUS WAVE RADAR SYSTEM

Filed June 5, 1947

INVENTOR.
WALTER VAN B. ROBERTS

BY  Walter van B Roberts

ATTORNEY

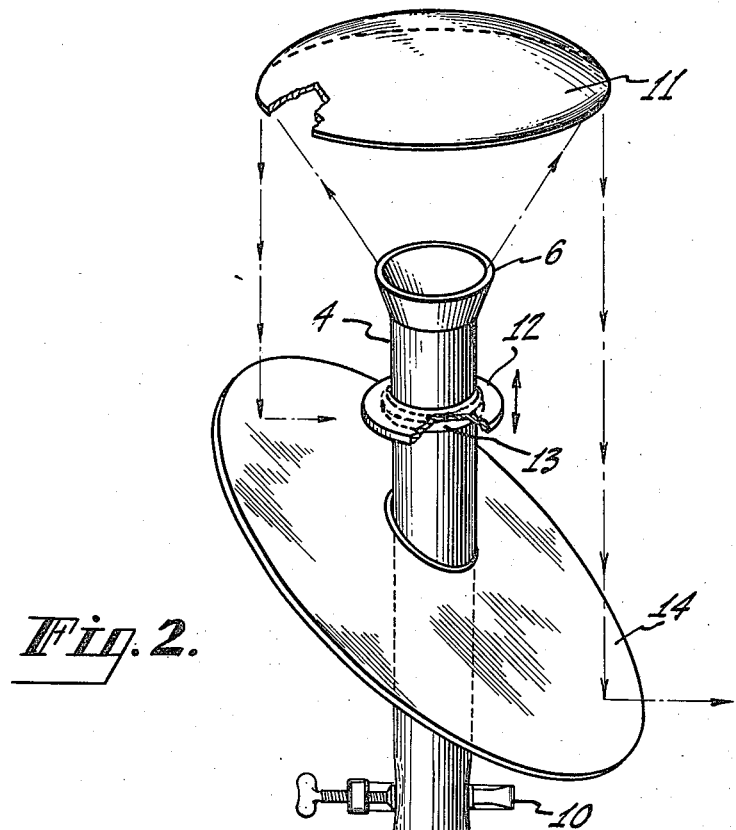
Fig. 2.
INVENTOR.
WALTER VAN B. ROBERTS
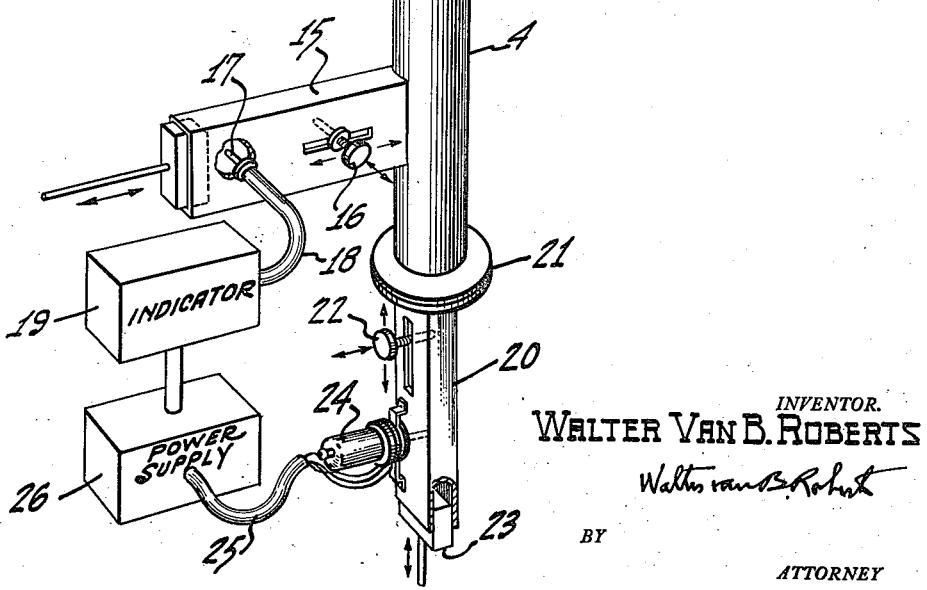
BY
ATTORNEY

Patented July 14, 1953

2,645,769

UNITED STATES PATENT OFFICE 2,645,769

CONTINUOUS WAVE RADAR SYSTEM

Walter van B. Roberts, Princeton, N. J.

Application June 5, 1947, Serial No. 752,582

2 Claims. (Cl. 343—8)

My invention relates to radar systems generally and especially to systems employing frequencies so high that wave guides rather than transmission lines may be employed for carrying wave energy. The invention is particularly advantageous in the case of continuous wave (C. W.) systems. Various features of the invention are of value for transmission and reception purposes other than those incidental to radar operation.

A primary object of the invention is to make possible the use of one and the same "antenna" device for both transmitting and receiving without sacrifice of power in either function and without deleterious interaction between functions.

Another important object is to provide a radar system which produces echoes from targets having any polarizing action whatsoever, and which also receives echoes having any type of polarization.

Another object is to provide a radar system which is so greatly simplified that it can be made to sell at a very low price and can be so compact that it can be employed in small boats for use in fog, or in small airplanes for altimeter purposes, or for various other purposes such as burglar alarms, automatic speed indicator, and so on.

The invention is described in the July, 1946 issue of Electronics magazine, together with photographs of several operating models and some performance data. This specification alone however will suffice for those skilled in the art of wave guide "plumbing" to make and operate systems embodying the invention.

In the single accompanying drawing,

Figure 2 shows a form of the invention preferred for actual operation.

Before proceeding with the explanation of the present invention it will be helpful to review briefly certain short-comings and difficulties of previous radar systems. In the first place previous systems customarily radiate plane polarized waves and if the target consists of thin parallel conductors, or a single conductor, no echo is produced if these conductors are perpendicular to the electric field of the impinging wave. Thus such systems fail to function on certain targets. In the second place it has been possible in the past to use one and the same antenna system for both transmitting and receiving only by means of one of two devices, each of which has its drawbacks. In the case of pulse radar a transmit-receive switch is employed. This introduces an undesirable complication and an unreliable element into the system. In the case of C. W. radar, bridge type networks have been used but only with a resulting considerable loss of power efficiency both in the transmitting and receiving functions. It will now be appreciated that previous C. W. radar systems have not achieved either of the first two objects of this invention listed above, while pulse systems have not achieved the second mentioned object.

Figure 1:
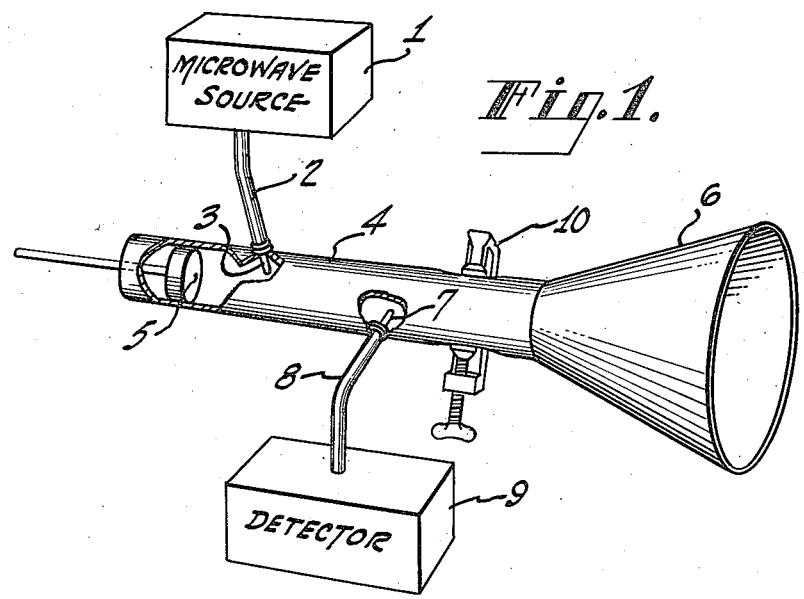
Figure 1 is a simplified form of the invention which is well adapted to the explanation of its principle of operation.

Referring now to Figure 1 a source of microwave power 1 feeds a coaxial transmission line 2 which terminates in a radiating probe 3 in a round wave guide 4. One end of this guide is closed off by means of adjustable piston 5 so that wave power fed into the guide is forced to leave by way of the other end of the guide which is connected to a horn type radiator 6. For the purpose of orderly explanation it will be assumed for the moment that the horn forms a perfectly non-reflecting termination for the guide, and that the guide is perfectly round and of uniform diameter. With these assumptions it is evident that only purely travelling waves will traverse the section of guide between probe 3 and the horn, and that these waves will not be rotating as to their polarization. That is, a pick-up probe 7 may be inserted in the guide at right angles to the transmitting probe 3 without abstracting any energy from the passing waves. Furthermore if the outgoing waves are reflected from a non-polarizing target such as a spherical surface they will again pass the detector pick-up probe 7 without affecting it. The pick up probe is connected by way of line 8 to a detector 9, so that any incoming waves having a component of polarization along (parallel with) the detector probe will be received without interference from waves being transmitted outwardly by probe 3.

In order to make the system operative for radar purposes it is necessary that reflected waves or echoes affect the detector and it is desirable that they should be fully absorbed by the detector. I have discovered that this desirable result may be achieved by adding to the arrangement heretofore described what I will call a polarization converter. This is a device that converts plane polarized waves to circularly polarized waves. It is so located that it is traversed both by outgoing waves and also by echo waves before they reach the detector probe. Such a converter is indicated by reference number 10 which shows a clamp arranged to squeeze and deform the guide slightly, the direction of the squeeze being at right angles to the axis of the guide and at forty-five degrees to probes 3 and 7. The amount of squeeze or the length of the portion of guide that is squeezed depend on the ratio of the operating frequency to the cut-off frequency of the guide, being less the nearer the frequency to cut-off. This converter does two things: first, by making the radiated waves circularly polarized it insures that echoes will be produced by any reflecting target, whether of the polarizing type or not; secondly it insures that echo waves will affect the detector regardless of the state of polarization of the echo. The circular polarization of the outgoing waves assures echoes from any kind of target because the rotating direction of the electric field necessarily passes through a condition of alignment with any possible current path in the target twice per cycle. The manner in which the converter assures reception is a little more complicated: if the echo signal is plane polarized the converter changes it to circular polarization so that excitation of the detector is assured as explained above in connection with the target. On the other hand if the echo is circularly polarized the converter changes it to plane polarized and furthermore with the plane of polarization coinciding with the detector probe. This last result is the outstanding feature of the invention because in the case of non-polarizing targets it assures the possibility of absorption by the detector of virtually all the echo power intercepted by the antenna system, thus achieving the main objects of the invention.

While circular polarization has been discussed it will be evident that exact circularity is not essential to obtaining a large measure of benefit from the system. The polarization converter preferably converts from plane to circular but if not accurately adjusted it will convert from plane to elliptical, and elliptical polarization can be considered as the superposition of circular polarization and a certain amount of plane polarization. Thus the action of the invention is present in proportion to the relative amplitude of the circularly polarized component produced by the converter. The term rotary polarization will be used to indicate a wave having a substantial circularly polarized component.

Up to now the assumption has been made that in the absence of a target to produce echoes there will be no excitation of the detector. In practice however it is desirable to divert a small fraction of the outgoing power to the detector to beat with echo waves. This may be done by making the detector probe axis not exactly at right angles to the transmitter probe, (although as will be seen later this is not the easiest way to obtain this result). The beat frequency output of the detector may be amplified by a simple audio amplifier. The frequency shift of the echo wave with respect to the transmitted wave may arise frome radial motion of the target (Doppler effect) or may be produced by frequency modulation of the transmitter in which case the beat frequency is proportional to target distance. I have found that frequency modulation produced by a very low frequency modulating voltage (of the order of 5 to 15 sweeps or cycles per second) produces audio beat tones of a pitch that is readily identifiable by ear as indicating whether a target is close by or far away. The modulating voltage must be of a subaudible frequency or it becomes difficult if not impossible to distinguish the beat tone, at least by ear. Higher modulation frequency may be used and a more accurate indication of distance obtained by displaying the beat voltage on a cathode ray oscilloscope whose sweep is produced by the modulating voltage. In the case of a moving target the frequency modulation is not necessary and the radial speed of the target expressed in wave lengths per second is one half the observed beat frequency. The Doppler effect and the frequency modulation system are employed according to the use to which the system is put. The former is used where the system is employed to measure speed or to indicate an approaching body, as in burglar alarms or the like. The latter is used for distance measurement such as altimeter operation from aircraft. A combination of the two may be used in some cases such as indicating the presence of nearby ships in a fog.

Up to now the assumption has remained that the only reflected signal is that produced by a more or less remote target. However, any mismatch between the wave guide and the antenna system will also set up a reflected wave which will return into the detector by the same mechanism as explained in connection with echo waves. It is therefore necessary in practice to provide some form of matching adjustment to reduce such reflections to the small magnitude that is desired to maintain heretodyne action in the detector. A slight mismatch of this sort is easier to employ in practice than a small adjustment of the angle between probes. Figure 2 shows a practical embodiment of the invention including a matching means suitable for waves of any kind of polarization. In this figure waves of rotary polarization emerge from the upper end of guide 4, optionally by way of a small horn 6, and illuminate a paraboloid reflector or "dish" 11 which throws a parallel ray beam downwards onto plane reflector 14 which projects the beam out sideways. A small circular disc reflector 12 is mounted on a collar 13 provided with friction or a set screw to hold it in place on the guide. This disc reflects a small amount of energy back to the dish and thence back into the wave guide. The wave so reflected back into the guide may be adjusted in phase by a small adjustment of the location of the disc on the guide, one half wave length of motion giving the full range of phase adjustment. The amplitude of the so reflected wave may be adjusted by large motions of the disc (two or more half wave lengths) so that with a suitable size of the disc the wave reflected back into the guide may be given any desired phase together with very nearly any desired amplitude, or any amplitude with nearly any desired phase. Since exact matching is not desired anyway, this matching means has proved very satisfactory in practice.

The use of reflector 14 is convenient in practice because the radiated beam can be rotated by turning the reflector about a vertical axis and without turning any other part of the equipment. Thus the reflector may be driven in continuous rotation for search purposes without the necessity for slip rings or rotating joints. In addition, if the hole through the reflector is made somewhat larger than necessary to accommodate the guide, a certain amount of vertical adjustment of the beam is possible also. The dish may form part of a roof over the whole structure and the whole assembly takes up less "floor space" than if its long dimension were horizontal. The arrangement also avoids feed complications that result when a guide is passed through the apex of the dish, and avoids the shadow cast by the guide when the guide is placed across the beam so as to bring its end into the focal point of the dish.

As to the portions of the system below reflector 14, the polarization converter is shown at 10, and the detector power is taken off from the guide by way of a section of ordinary rectangular guide 15 having its larger dimension parallel to the guide and its length at right angles to the guide and forty five degrees from the axis of squeeze 19. The detector guide may be furnished with a tuning screw in a slot as indicated at 16 and optionally with a tuning piston at its far end. The crystal detector is mounted across the guide as shown at 17 in conventional manner and the detector output is carried by way of coaxial line 18 to indicating means 19. Element 19 may comprise a simple audio amplifier and loud speaker. The detector guide makes a butt joint to a rectangular window in guide 4 matching the internal dimensions of the rectangular guide. Preferably one or more thin metal wires or strips are set across the aforesaid window parallel to its long dimension to act as a by-pass for waves of the wrong polarization while permitting free access into the detector for waves of the correct polarization. This refinement is not necessary and has not been shown in the drawing. Furthermore, once approximately correct length of detector guide and location of the crystal are determined, no adjustment of the detector branch is required in operation. The use of rectangular guide for taking off detector power has proved more satisfactory than the probe shown in Figure 1.

Similarly it has been found advantageous to feed in power by way of a rectangular guide as shown at 20. The end of this guide may be coupled to the end of round guide 4 by means of flange coupling 21, the broad dimension being perpendicular to that of the detector guide. Power is fed into guide 20 from a small reflex klystron 24 mounted conventionally on the broad face with its radiating member extending into the guide. The power output of the klystron may be maximized by suitable adjustments of a tuning screw in a slot indicated at 22 or by a piston 23 in the lower end of the guide, or both. As in the case of the detector it is desirable to put a thin strip across the opening in the joint 21 to act as a reflector of waves polarized at right angles to the polarization of the klystron waves, while not affecting the latter. The klystron is fed with energizing power by way of cable 25 from power supply 26 which may include alternating voltage superposed on the repeller voltage for frequency modulation. Finally, the distance between joint 21 and the detector guide should be chosen to facilitate the flow of echo waves into the detector. I have found satisfactory a distance of a quarter wave or odd multiple thereof, measured from joint 21 to the center of the detector guide. (This wave length is as measured inside the guide 4.) One reason the arrangement of power input and detector take off shown in Figure 2 is preferred is because the adjustments of the source and detector for maximum output are substantially independent.

In setting the system up, the upper end of guide 4 is first placed in the focus of the dish. If the focal distance is very long it may be well to use a small horn as indicated at 6 to concentrate the output of the guide onto the dish. The exact location of the horn or end of the guide is not critical with respect to performance but it is with respect to antenna matching and it is well to adjust this location slightly to give the best match consistent with sharpness of beam. Further matching can then be done by means of disc 12. Matching may be done by reference to detector current once some squeeze has been applied so that mismatch causes detector current. When properly tuned up the detector current is minimum with respect to the matching adjustment but maximum with respect to adjustments of power output and detector tuning, and amount of squeeze. If the matching turns out to be so good that very little detector current flows, the matching is then thrown off until a fraction of a milliampere flows, assuming that the crystal is of the common variety. The foregoing adjustments should of course be carried out with the beam pointed off into free space.

Figure 3:
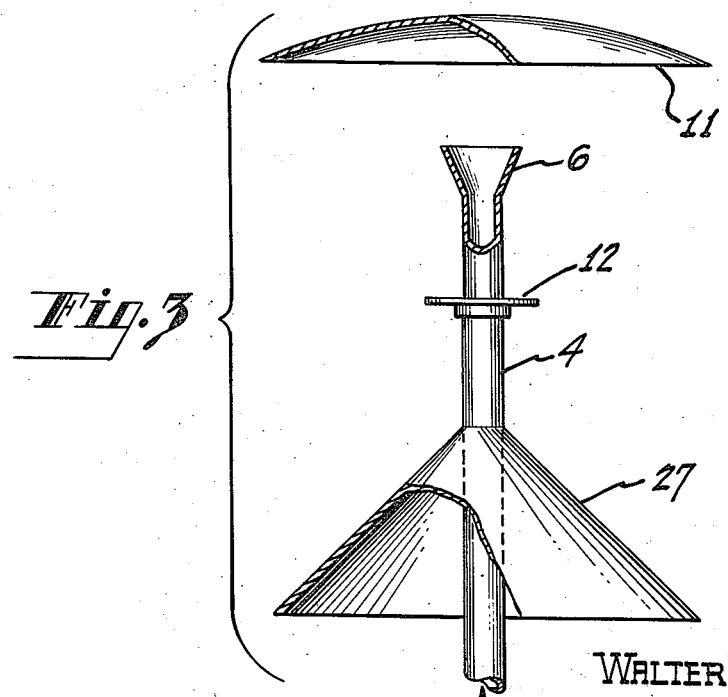
Figure 3 shows an alternative antenna system adapted to certain special types of operation.

For many purposes it is desirable to radiate as sharp a beam as possible, thus obtaining operation at maximum range and accurate indication of direction. For some purposes however a different shaped beam is required. Figure 3 shows an arrangement which when employed with the rotary wave system gives a beam in the form of a conical sheet, all parts of which are formed of waves having the same kind of polarization. This arrangement differs from that shown in Figure 2 only in that reflector 14 of Figure 2 is replaced by conical reflector 27 in Figure 3. This converts the parallel ray beam formed by dish 11 into a thin conical sheet of radiation whose cone angle depends on the cone angle of the reflector 27. In particular if the latter has a semi-angle of 45 degrees the radiation is emitted in a thin plane sheet. This latter type of pattern is useful where the system is set up to detect objects approaching from any direction in a horizontal plane. It is also possible to combine the patterns of the plane reflector and the conical reflector by reflecting part of the parallel ray beam from one type reflector and the remaining part from a different type reflector and thus obtain various special patterns.

While I have described in detail certain embodiments of my invention, it should be understood that many variations are possible within its scope. For example:

Although especially well adapted to C. W. operation the invention may also be employed in low power pulse radar systems to eliminate the need for a transmit-receive switch.

Other types of polarization converters may be used besides the squeeze method. A thin strip of polystyrene may be inserted in the guide with its plane at 45 degrees to the input and output axes. The amount of ellipticity increases with the length of the strip.

For better signal to noise ratio in the detector a local oscillator voltage may be mixed with the echo signal to give a high intermediate frequency which is then amplified and detected.

Any type of radiator may be used that can be adjusted to act as a substantially non-reflective load for circularly polarized waves.

I therefore do not consider the invention to be limited except in accordance with the appended claims.

What is claimed is:

1. A continuous wave radar speed indicating device comprising, an uninterrupted source of plane polarized waves, means including an antenna for radiating and receiving echo waves returned thereto by reflection from a moving object, wave guide means connecting said source of waves to said radiating means, heterodyne detecting means responsive to plane polarized waves coupled to said wave guide means and positioned substantially normal to the plane of polarization of the waves supplied by the source and arranged to intercept a small portion of the waves traveling from said source toward said radiating means, and further means so positioned as to be traversed by the outgoing waves from said source subsequent to their passage past said detecting means, said further means operating to convert the polarization of the outgoing waves from plane to substantially rotary and to convert the polarization of the returned waves that are reflected from the moving object from rotary to plane with the plane of polarization parallel to the detecting means and substantially normal to the plane of polarization of the waves supplied by the source whereby the heterodyne detector will produce a difference frequency variation that is a function of the rate of motion of the moving object toward or from the radiating means, an indicator, and means to apply the produced difference frequency to said indicator, whereby an indication of the speed of the moving object may be produced.

2. A micro-wave speed indicating device comprising an uninterrupted source of plane polarized microwave energy, means to apply energy from the source to one end of a waveguide, common energy radiating and receiving means associated with the other end of the wave guide, a polarization converting device associated with the wave guide and located in a common path of the outgoing waves and the received microwave energy reflected from a moving object the speed of which, in a direction toward or from the common energy radiating and receiving means, is to be indicated, said polarization converting device operating to convert the polarization of the outgoing waves from plane to substantially rotary and to convert the polarization of the received waves that are reflected from the moving object from rotary to substantially plane, with the plane of polarization of the so converted reflected waves substantially normal to the plane of polarization of the waves from the source, a beat frequency detecting device associated with the wave guide and located between the source of microwave energy and the polarization converting device, said detecting device being so angularly disposed as to intercept a major portion of the received energy that is reflected from the moving object and only such small portion of the energy from the source as is required for heterodyne purposes, whereby the beat frequency detecting device will supply a relatively low frequency signal corresponding to the difference between the frequency of the source and the frequency of the reflected energy as altered by the rate of motion of the moving object relative to the energy radiating and receiving means, an indicator, and means to apply to the indicator the low frequency signal supplied by the beat frequency detector whereby an indication of the rate of change of distance between the object and the energy radiating and receiving means may be produced.

WALTER van B. ROBERTS.

References Cited in the file of this patent

UNITED STATES PATENTS

| Number | Name | Date |
| --- | --- | --- |
| 1,931,980 | Clavier | Oct. 24, 1933 |
| 2,011,392 | Bentley | Aug. 13, 1935 |
| 2,043,347 | Clavier | June 9, 1936 |
| 2,129,669 | Bowen | Sept. 13, 1938 |
| 2,403,289 | Korman | July 2, 1946 |
| 2,407,068 | Fiske et al. | Sept. 3, 1946 |
| 2,407,644 | Benioff | Sept. 17, 1946 |
| 2,412,631 | Rice | Dec. 17, 1946 |
| 2,421,028 | King | May 27, 1947 |
| 2,423,644 | Evans | July 8, 1947 |
| 2,436,627 | Blitz | Feb. 24, 1948 |
| 2,440,210 | Riblet | Apr. 20, 1948 |
| 2,451,822 | Guanella | Oct. 19, 1948 |
| 2,452,349 | Becker | Oct. 26, 1948 |
| 2,461,005 | Southworth | Feb. 8, 1949 |
| 2,472,212 | Hudspeth | June 7, 1949 |
| 2,500,795 | Bruck et al. | Mar. 14, 1950 |
| 2,510,461 | Bruck et al. | June 6, 1950 |
| 2,531,455 | Barrow et al. | Nov. 28, 1950 |
| 2,607,849 | Purcell et al. | Aug. 19, 1952 |

FOREIGN PATENTS

| Number | Country | Date |
| --- | --- | --- |
| 108,349 | Australia | Sept. 7, 1939 |